United States Patent
Kennedy et al.

(10) Patent No.: US 9,088,489 B2
(45) Date of Patent: Jul. 21, 2015

(54) SIMPLIFIED ACTIVATION AND MANAGEMENT OF WIRELESS WIDE AREA NETWORK (WWAN) ACCOUNT

(75) Inventors: Sean Patrick Kennedy, San Diego, CA (US); Fredrik Carpio, San Diego, CA (US); Paul Jin Hwang, Solana Beach, CA (US); Gary Robert Lyons, San Diego, CA (US); Edward Theodore Winter, San Diego, CA (US); Michael Chang, San Diego, CA (US); Andrew Lee Lawton, San Marcos, CA (US)

(73) Assignee: Sony Corporation, Tokyo (JP)

( * ) Notice: Subject to any disclaimer, the term of this patent is extended or adjusted under 35 U.S.C. 154(b) by 693 days.

(21) Appl. No.: 12/853,678

(22) Filed: Aug. 10, 2010

(65) Prior Publication Data
US 2012/0042035 A1    Feb. 16, 2012

(51) Int. Cl.
| G06F 15/16 | (2006.01) |
| H04L 12/24 | (2006.01) |
| H04L 5/00 | (2006.01) |
| H04L 12/14 | (2006.01) |
| H04W 8/20 | (2009.01) |

(52) U.S. Cl.
CPC .......... *H04L 41/0806* (2013.01); *H04L 5/0098* (2013.01); *H04L 12/1457* (2013.01); *H04L 12/1482* (2013.01); *H04W 8/20* (2013.01)

(58) Field of Classification Search
CPC . H04W 4/12; H04L 12/5855; H04M 1/72547
USPC ................ 455/419, 406, 435.1, 414.1, 414.2; 709/223, 224, 217, 218, 234; 370/351; 705/26; 707/102
See application file for complete search history.

(56) References Cited

U.S. PATENT DOCUMENTS

| 6,745,022 B2 * | 6/2004 | Knox ............................. 455/406 |
| 7,181,455 B2 | 2/2007 | Wookey et al. |
| 7,707,573 B1 | 4/2010 | Marmaros et al. |
| 8,355,696 B1 * | 1/2013 | Olding et al. ................. 455/411 |
| 2003/0236087 A1 * | 12/2003 | Stenton ......................... 455/418 |
| 2004/0235458 A1 * | 11/2004 | Walden et al. ............. 455/414.1 |
| 2007/0171910 A1 * | 7/2007 | Kumar .......................... 370/392 |
| 2008/0070495 A1 * | 3/2008 | Stricklen et al. ............. 455/3.01 |
| 2008/0096507 A1 * | 4/2008 | Erola ......................... 455/187.1 |
| 2008/0167027 A1 * | 7/2008 | Gautier et al. ................ 455/419 |
| 2009/0068987 A1 * | 3/2009 | O'Neil et al. ................. 455/411 |
| 2009/0158148 A1 * | 6/2009 | Vellanki et al. ............... 715/700 |
| 2010/0167733 A1 * | 7/2010 | Kumar et al. ............. 455/435.1 |

* cited by examiner

*Primary Examiner* — Aftab Nasir Khan
(74) *Attorney, Agent, or Firm* — Sony Corporation

(57) ABSTRACT

A computer establishes a wireless wide area network (WWAN) account simply by entering his telephone number in a user interface (UI) which is sent to an Internet server and correlated with the user's telephone account. A utility notes when a usage limitation for a period is approaching and in response disables wireless updates and automatically executes the updates when a landline connection is sensed.

11 Claims, 3 Drawing Sheets

WWAN Setup Logic

WWAN Management Logic

SIMPLIFIED ACTIVATION AND MANAGEMENT OF WIRELESS WIDE AREA NETWORK (WWAN) ACCOUNT

FIELD OF THE INVENTION

The present application relates generally to simplified activation and management of wireless wide area network (WWAN) accounts for user computers.

BACKGROUND OF THE INVENTION

Wireless wide area network (WWAN) data connectivity may be afforded to user computers. In this way Internet connectivity is facilitated typically over a telephony transceiver, which has the advantage of not requiring wired access or positioning of the computer within range of a wireless LAN access point.

As understood herein, setting up a WWAN account typically entails significant data entry and setup on the part of the user. Furthermore, since many WWAN accounts come with a string attached—limits on how much data is transferred using the WWAN account for a period of e.g., a month (referred to as bandwidth limitations), users must, distractingly, manage their WWAN usage either to prevent overcharges or complete WWAN account disablement is the bandwidth limits are exceeded.

SUMMARY OF THE INVENTION

Accordingly, a computing device has a processor, a video display controlled by the processor, and a wireless wide area network (WWAN) transceiver communicating with the processor. The processor presents on the display a WWAN account setup user interface (UI). The UI enables a user to establish a WWAN account for WWAN access by the processor through the WWAN transceiver by enabling a user to input using the UI a telephone number associated with the user and, at most apart from the telephone number, a name of a wireless telephony service provider providing service to the telephone number. The user is able to establish the WWAN account for WWAN access by the processor without further data entry to the processor required on the part of the user.

In some embodiments the UI includes a prompt to alert the user that the UI is for automatic simplified WWAN setup, with the UI informing the user that if the user wishes to setup a WWAN account, the user should enter a user telephone number into an entry field of the UI. The UI may include a wireless service provider entry element, and if so the processor can correlate the provider name input by means of the wireless service provider entry element with a network address of the service provider. Without limitation, the processor can obtain service provider names and respective network addresses during manufacturing of the device and/or from a network interface communicating with the processor.

On the other hand, in some embodiments the user enters no service provider information apart from the telephone number. In such an embodiment the processor can send the telephone number to a management server which correlates the number to a wireless service provider.

In another aspect, a method includes receiving, from a client computer device, a telephone number. The telephone number is associated with a user wireless telephony account by, for example, a computer processor accessing a non-transitory data storage medium. Based on reception of the telephone number and a determination that the telephone number is associated with an active wireless telephony account, the method includes establishing a wireless wide access network (WWAN) data account for the client computer device.

In another aspect, a computing device has a processor, a video display controlled by the processor, and a wireless wide area network (WWAN) transceiver communicating with the processor. The processor executes logic that includes monitoring WWAN usage through the WWAN transceiver for an accounting period, and responsive to a determination that usage is at a threshold for the period, disabling some but not all use of the WWAN transceiver by the processor to communicate with a network.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
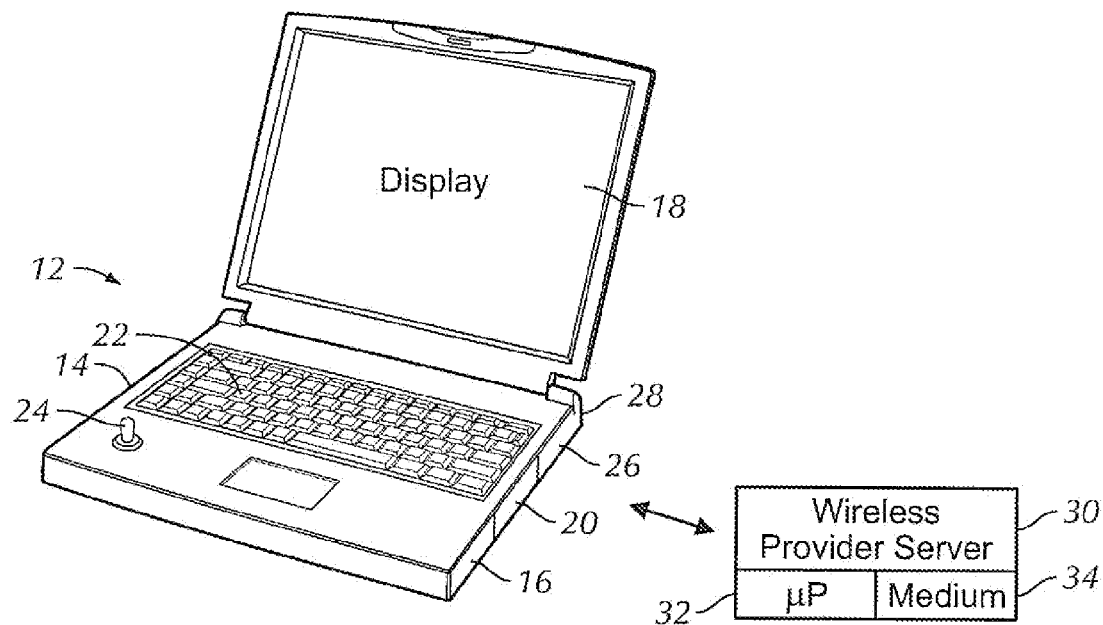
FIG. 1 is a block diagram of an example system in accordance with present principles, schematically showing interior components of the computer.

Referring initially to FIG. 1, a computing device 12 such as a personal digital assistant, laptop computer, personal computer (PC), etc. includes a housing 14 hearing a digital processor 16. The processor 16 can control a visual display 18 and an audible display such as one or more speakers. The processor 16 may access a media player module such that the device 12 has media decoding capability.

To undertake present principles, the processor 16 may access one or more computer readable storage media 20 such as but not limited to RAM-based storage, a chip implementing dynamic random access memory (DRAM)) or flash memory or disk storage. Software code implementing present logic executable by the device 12 may be stored on one of the memories shown to undertake present principles.

The processor 16 can receive user input signals from various input devices, including a keyboard or keypad 22 (hereinafter "keypad" without loss of generality), a point and click device such as a mouse or joystick 24, etc. A network interface 26 such as a wired or wireless modem or wireless telephony transceiver may also be provided and may communicate with the processor 16. Furthermore, a wireless wide area network (WWAN) transceiver 28 can be supported on the housing in communication with the processor 16 to establish wireless communication between the processor 16 and a WAN such as the Internet. Without loss of generality, the WWAN transceiver 28 may be data-capable code division multiple access (CDMA) transceiver or variant (such as, e.g., w-CDMA), a Global System for Mobile Communications (GSM) transceiver with general packet radio service (GPRS) or enhanced GPRS (EDGE) capability, a data-capable frequency division multiple access (FDMA) transceiver, a data-capable time division multiple access (TDMA) transceiver, a data-capable space division multiple access (SDMA) transceiver or variant, a data capable orthogonal frequency division multiplex (OFDM) transceiver, an International Mobile Telecommunications-2000 (IMT-2000) ("3G") transceiver, etc.

In any case, the device 12 may communicate through the interface 26 and/or WWAN transceiver 28 with a wireless provider server 30 having a server processor 32 accessing a computer readable storage medium 34 to undertaken present logic.

Figure 2:
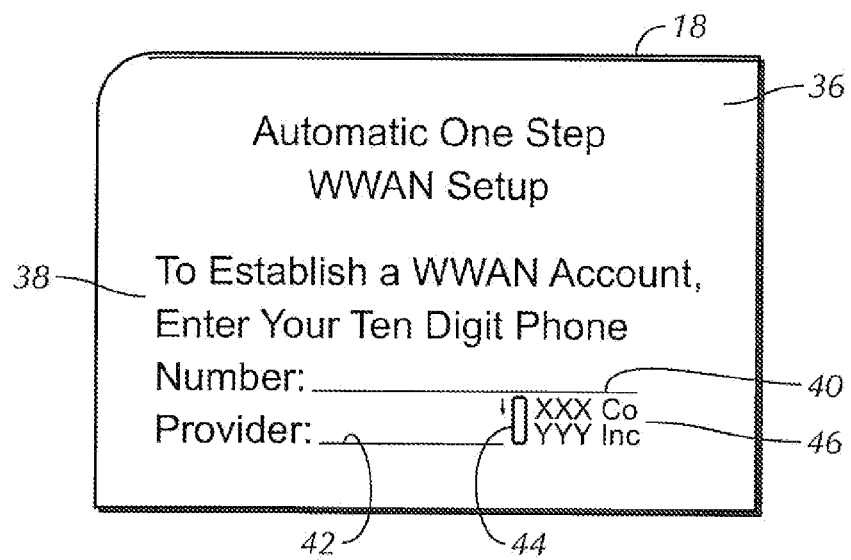
FIG. 2 is a screen shot of an example user interface (UI) for establishing a WWAN account easily and simply.

Now referring to FIG. 2, the computing device processor 16 accessing the storage medium 20 can present a WWAN setup UI 34 on the display 18 as shown. The UI 34 may be invoked from a setup menu or application menu or other menu, or upon, e.g., the first attempt by the user of the device 12 to establish wireless communication with the Internet.

As shown, the example UI 34 shown in FIG. 2 includes a prompt 38 to alert the user that it is for automatic simplified WWAN setup, and informing the user that if the user wishes to setup a WWAN account, the user should enter his telephone number into an entry field 40. Also, in some embodiments the user enters his wireless service provider's name into a provider entry field 42. e.g., by typing in the provider's name or by operating a slide bar 44 to select a provider from a list 46 of providers. In this way, the processor 16 correlates the provider with a website address of that provider associated with WWAN account establishment. The list of wireless provider websites can be loaded into the memory 20 during manufacturing pursuant to an agreement between one or more wireless providers and manufacturer of the device 12. Or, the list of wireless service providers may be downloaded to the device 12 through the network interface 26 from a device 12 manufacturer server that the device 12 periodically contacts or by other means. Yet again, no wireless service provider list need be provided, in which case the processor 16 can send the telephone number to a management server associated with, e.g., the manufacturer of the device 12 which in turn correlates the number to the wireless service provider associated with the block of telephone numbers containing the one that the user inputs into the field 40. The processor 16 then establishes communication with the server corresponding to the provider entered into the provider field 42 (e.g., the server 30 shown in FIG. 1) (or with the management server in the last example above) and sends to the server the telephone number.

Figure 3:
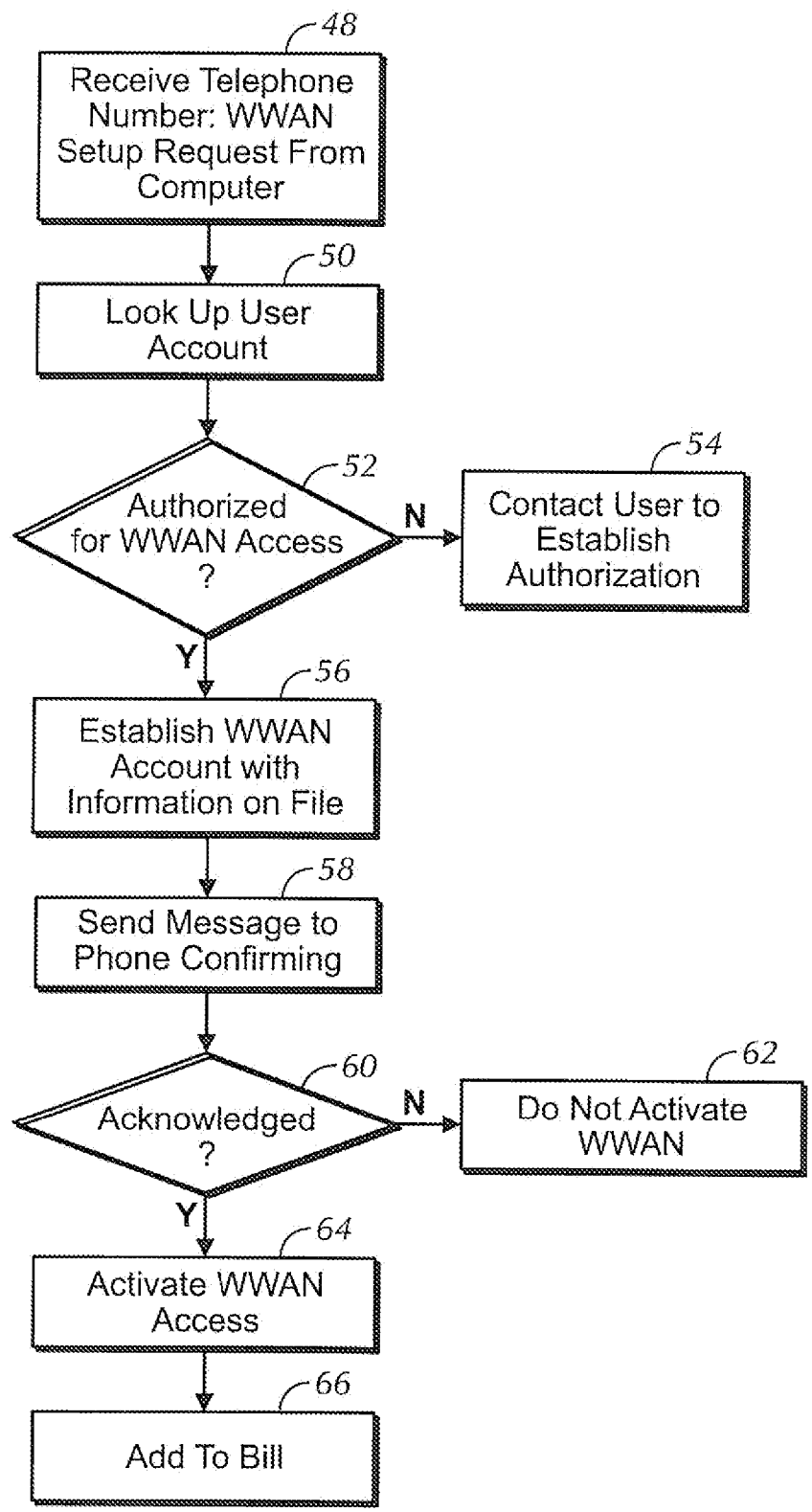
FIG. 3 is a flow chart of example logic that may be used to establish the WWAN account.

FIG. 3 illustrates the logic that is then executed by the server processor 32 with some of the steps being executed by the device processor 16. Commencing at block 48, the server receives the telephone number from the device 12. A request to set up a WWAN account for the device 12 may accompany the telephone number. The user account is looked up at block 50 based on the telephone number. Of course, if no active account can be correlated to the received number the logic ends.

If desired, the logic may proceed to decision diamond 52 to determine whether the user, in setting up his telephone account, authorized simplified WWAN establishment for data transmission purposes along with conventional telephony service. In some embodiments this decision may be omitted and the logic may proceed directly to block 56. If the user did not authorize simplified WWAN establishment for data transmission purposes along with conventional telephony service, the logic may flow from decision diamond 52 to block 54 wherein the user is contacted, telephonically, in writing, or via the CE device 12, to authorize simplified WWAN establishment for data transmission purposes along with conventional telephony service, and once authorization is obtained, the logic moves to block 56.

At block 56 a WWAN account for data transmission purposes is established by the server. In some embodiments, the logic may proceed directly from block 56 to block 64 to activate the account but in other embodiments as shown the logic proceeds to block 58 to send a message such as an automated voice call or short message service (SMS) text message to the telephone having the number entered into the UI of FIG. 2, asking the user to confirm the user's desire to establish a WWAN account for data transmission purposes. If the user does not return a positive acknowledgement, the logic does not activate the WWAN account at block 62, but otherwise the logic activates the account at block 64, permitting the computer 12 to begin to communicate with the Internet using the WWAN transceiver 28, and then adds appropriate accounting information to the user's next bill at block 66.

Figure 4:
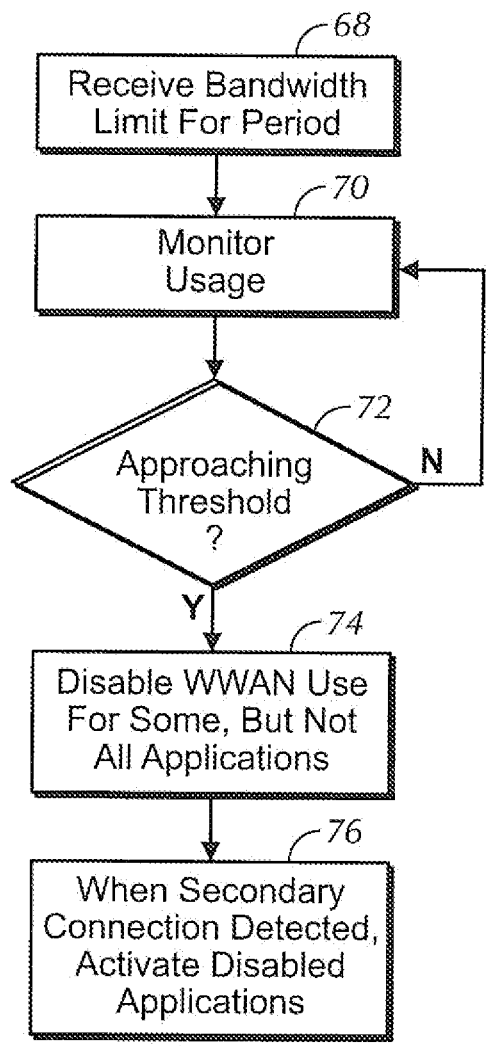
FIG. 4 is a flow chart of example logic that may be used to manage the WWAN account as it approaches a bandwidth limit.

FIG. 4 illustrates logic that may be executed by the processor 16 to manage use of a WWAN data access account. Commencing at block 68, the processor receives (from, e.g., the server 30) the bandwidth use per period (typically per month) associated with the account. In an example, bandwidth use might be measured in minutes of WWAN access and/or in bandwidth speed. The WWAN bandwidth usage for the period is monitored at block 70. It is to be understood that the monitoring at block 70 typically starts anew at the beginning of each bandwidth allocation period. e.g., at the beginning of each month.

When the processor determines, at decision diamond 72, that the usage reaches a threshold, e.g., 90% of total allocated use (such as total allocated minutes) for a period before WWAN use is terminated for the prior or 90% of total allocated use for a period before excess bandwidth fees are incurred, some, but not all, WWAN use is automatically disabled at block 74.

In addition or alternatively, a warning may be presented on the device to the user that a desire operation, e.g., download of a video, would consume more minutes than currently remain available for the period without an excess charge being incurred. The user can decide whether to cancel the ordered operation or allow it to proceed with the understanding that proceeding may result in excess usage tees. If the operation is canceled the logic automatically cues the operation for execution as soon as a wired connection or unlimited wireless connection is sensed to the network. The above options can be combined, i.e., the user can be presented a UI enabling the user to select whether to be warned upon approaching a usage allotment, or not to be warned, in which ease operations estimated to exceed the usage allotment are automatically canceled and queued for execution as soon as a wired connection or unlimited wireless connection is sensed to the network.

It is to be understood that multiple thresholds may be used. For example, a first threshold might be 50% of allocation having been consumed on or before the midway point of the period, a second threshold might be 75% of allocation having been consumed on or before three quarters of the way through the prior, and a third threshold might be 90% or even 100% of allocation having been consumed up until the last three days of the period. Other triggering thresholds for the logic to move to block 74 may be used. In some implementations, as an example of applications that might be denied WWAN connectivity are software update operations.

If desired, once some WWAN use has been curtailed, the processor may, at block 76, upon detection of a secondary connection with unlimited bandwidth access, e.g., detection of a wired connection to the Internet or detection of an unlimited wireless local area network (WLAN) connection via the network interface 26, activate the disabled applications for network access over the secondary connection. In the above example, if operating system updates were disabled at block 74 owing to WWAN bandwidth usage approaching a threshold, upon detection of a wired Internet connection at block 76 the processor 16 might automatically execute downloading the updates over the wired connection, transparently to the user.

While the particular SIMPLIFIED ACTIVATION AND MANAGEMENT OF WIRELESS WIDE AREA NETWORK (WWAN) ACCOUNT is herein shown and described in detail, it is to be understood that the subject matter which is encompassed by the present invention is limited only by the claims.

What is claimed is:

1. A computing device comprising:
   one or more processors communicating with a wireless wide area network (WWAN) transceiver, the one or more processors operable to:
   display a user interface (UI) comprising a wireless service provider entry field and a telephone number entry field to enable a user to establish a WWAN account for WWAN access through the WWAN transceiver,
   wherein the one or more processors correlates a provider name with a network address of the wireless service provider,
   wherein the one or more processors obtain service provider names and respective network addresses during manufacturing of the computing device and/or from a network interface communicating with the one or more processors, and
   wherein the user interface (UI) receives a single input of a telephone number associated with the user through the telephone number entry field and a provider name through the wireless service provider entry field, the user being able to establish the WWAN account on the computing device for the WWAN access by the one or more processors, without further data entry by the user.

2. The computing device of claim 1, wherein the one or more processors sends the telephone number to a management server which correlates the telephone number to a wireless service provider.

3. The computing device of claim 1, wherein the user interface (UI) requests an input of a name of a wireless telephony service provider providing wireless telephony service to the telephone number.

4. The computing device of claim 1, wherein the user interface (UI) comprises a prompt to alert the user that the user interface (UI) enables automatic simplified WWAN setup, and to inform the user that if the user wishes to setup the WWAN account, the user is required to enter the telephone number into the telephone number entry field of the user interface (UI).

5. The computing device of claim 4, wherein the user interface (UI) receives the provider name through the wireless service provider entry field.

6. A method, comprising:
   in a server communicatively coupled to a client computing device:
   receiving a single input of a telephone number from the client computing device and the client computing device comprising one or more processors communicating with a wireless wide area network (WWAN) transceiver, the one or more processors operable to:
   display a user interface (UI) comprising a wireless service provider entry field and a telephone number entry field to enable a user to establish a WWAN account for WWAN access through the WWAN transceiver connected to the server,
     wherein the one or more processors correlates the provider name with a network address of a wireless service provider;
     wherein the user interface (UI) receives the single input of a telephone number associated with the user through the telephone number entry field and a provider name through the wireless service provider entry field, the user being able to establish the WWAN account on the computing device for the WWAN access by the one or more processors, without further data entry by the user;
   associating the telephone number with a user-wireless telephony account of the user; and
   establishing a wireless wide access network (WWAN) data account for the client computing device, based at least in part on reception of the telephone number and a determination that the telephone number is associated with an active wireless telephony account.

7. The method of claim 6, further comprising after determining that the telephone number is associated with an active wireless telephony account, determining whether the wireless telephony account is authorized for establishing the WWAN data.

8. The method of claim 6, further comprising activating the WWAN data account to permit the client computing device to access a network using the WWAN data account when a response is received confirming the establishment of the WWAN data account.

9. The method of claim 6, further comprising adding an accounting information to user's next bill for providing WWAN data access based on the established WWAN data account.

10. The method of claim 6, wherein prior to permitting a network access using the WWAN data account, a message is sent to the telephone number requesting confirmation to establish the WWAN data account, wherein the message sent to the telephone number is one of a short message service (SMS) or a voice message over an automated voice call.

11. The method of claim 6, further comprising determining whether the wireless telephony account is authorized for WWAN data account establishment, wherein authorization for the WWAN data account establishment comprises contacting the user on the telephone number or via a network on the client computing device.

* * * * *